United States Patent
Peterson et al.

(10) Patent No.: US 9,082,203 B2
(45) Date of Patent: Jul. 14, 2015

(54) IMAGE PROCESSING SYSTEM FOR IMAGE RESIZING BASED UPON OPERATIONAL FEEDBACK PARAMETERS AND RELATED METHODS

(75) Inventors: Aric Peterson, Palm Bay, FL (US); Tariq Bakir, Melbourne, FL (US); Robert McDonald, Palm Bay, FL (US); John Heminghous, Melbourne, FL (US); Christopher T. Dunkel, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 1037 days.

(21) Appl. No.: 12/634,858

(22) Filed: Dec. 10, 2009

(65) Prior Publication Data

US 2011/0141143 A1    Jun. 16, 2011

(51) Int. Cl.
  *G06T 3/40*  (2006.01)
  *G06T 7/00*  (2006.01)
  *G09G 5/00*  (2006.01)
  *G06K 9/32*  (2006.01)

(52) U.S. Cl.
  CPC .............. *G06T 3/4092* (2013.01); *G06T 3/40* (2013.01); *G06T 7/0081* (2013.01)

(58) Field of Classification Search
  None
  See application file for complete search history.

(56) References Cited

U.S. PATENT DOCUMENTS

| | | | |
|---|---|---|---|
| 6,345,298 B1 | 2/2002 | Moriya | 709/228 |
| 2005/0164679 A1 | 7/2005 | Beardow | |
| 2006/0126952 A1* | 6/2006 | Suzuki et al. | 382/233 |
| 2006/0279655 A1 | 12/2006 | Chen et al. | 348/441 |
| 2006/0285753 A1* | 12/2006 | Yamasaki | 382/209 |
| 2008/0024513 A1 | 1/2008 | Raveendran | |
| 2009/0180713 A1 | 7/2009 | Bucha et al. | |
| 2009/0276695 A1* | 11/2009 | Hodges et al. | 715/249 |
| 2009/0324078 A1* | 12/2009 | Wu et al. | 382/173 |
| 2010/0292002 A1* | 11/2010 | Ward et al. | 463/30 |
| 2011/0091132 A1* | 4/2011 | Kumar et al. | 382/298 |

OTHER PUBLICATIONS

Denis Simakov et al, Summarizing visual data using bidirectional similarity, Computer Vision and Pattern Recognition, 2008, IEEE Conference, Jun. 23-28, 2008.*
Hwang et al., "Content-aware image resizing using perceptual seam carving with human attention model", Multimedia and Expo, IEEE International Conference, Jun. 2008, pp. 1029-1032.
Smith et al., "Content-based transcoding of images in the Internet", Image Processing Proceedings, IEEE Computer Soc., vol. 3, Oct. 1998, pp. 7-11.
Wang et al., "Image quality assessment: from error visibility to structural similarity", IEEE Transactions on Image Processing, vol. 13, No. 4, Apr. 2004, pp. 600-612.
Wolf et al., "Non-homogeneous content-driven video-retargeting", Computer Vision, IEEE 11$^{th}$ International Conference, Oct. 2007, pp. 1-6.
Avidan et al., *Sean Carving for Content-Aware Image Resizing*, ACM Transactions on Graphics, vol. 26, No. 3., 2007.

* cited by examiner

*Primary Examiner* — Tize Ma
(74) *Attorney, Agent, or Firm* — Allen, Dyer, Doppelt, Milbrath & Gilchrist, P.A.

(57) ABSTRACT

An image processing system may include a transceiver configured to communicate with a remote terminal over a communications channel. Furthermore, an image processor may cooperate with the transceiver and be configured to determine an operational parameter associated with at least one of the communications channel and the remote terminal, generate a resized image from an original image based upon an energy function and the operational parameter, and transmit the resized image to the remote terminal over the communications channel.

19 Claims, 5 Drawing Sheets

IMAGE PROCESSING SYSTEM FOR IMAGE RESIZING BASED UPON OPERATIONAL FEEDBACK PARAMETERS AND RELATED METHODS

FIELD OF THE INVENTION

The present invention relates to the field of image processing, and, more particularly, to image formatting and related methods.

BACKGROUND OF THE INVENTION

Advancements in image sensor technology have lead to a demand for higher resolution capabilities, namely the ability to provide images with larger numbers of pixels. For example, image sensors continue to increase in the number of pixels they are able to capture, and high definition (HD) video is becoming the norm in many applications.

Image display systems have also seen great advancements in technology, but the advancements sometimes take different forms. For example, significant effort has been made in providing large, high-resolution monitors (e.g., plasma and LCDs), which are now readily available and continue to decrease in price. On the other hand, significant effort has also been invested in creating small-scale displays that can meet the unique requirements of mobile phones and other similar devices, such as durability, power consumption, weight, etc.

Despite the wide array of display types that exist, the delineation between computers, televisions, and mobile phones continue to be become less pronounced. That is, users now may desire to view images on a computer or television monitor, or may desire to view these same images on a mobile device (or both). Yet, if content is formatted for a particular type of display, it may not provide desired results when viewed on other displays.

As such, various approaches are sometimes used for resizing or re-formatting images for different applications. One approach for image resizing is described in a article to Avidan et al. entitled "Seam Carving for Content-Aware Image Resizing," ACM Transactions on Graphics, Vol. 26, No. 3. (2007), which is hereby incorporated in its entirety by reference. This article discusses that effective resizing of images should not only use geometric constraints, but consider the image content as well. A image operator is presented called "seam carving" that supports content-aware image resizing for both reduction and expansion. A seam is an optimal 8-connected path of pixels on a single image from top to bottom, or left to right, where optimality is defined by an image energy function. By repeatedly carving out or inserting seams in one direction the aspect ratio of an image can be changed. By applying these operators in both directions the image to a new size can be retargeted. The selection and order of seams protect the content of the image, as defined by the energy function.

Despite the advantages of such approaches, further flexibility in resizing images may be desirable in certain applications.

SUMMARY OF THE INVENTION

In view of the foregoing background, it is therefore an object of the present invention to provide a system and related methods for providing effective resizing of images.

This and other objects, features, and advantages are provided by an image processing system which includes a transceiver configured to communicate with a remote terminal over a communications channel. Furthermore, an image processor cooperates with the transceiver is configured to determine an operational parameter associated with at least one of the communications channel and the remote terminal, generate a resized image from an original image based upon an energy function and the operational parameter, and transmit the resized image to the remote terminal over the communications channel. The system thereby provides for resizing of images without altering desired content in the image, and also while accounting for the various channel or remote terminal parameters that would otherwise degrade performance.

More particularly, the image processor may be further configured to generate the resized image based upon removing or adding (or both) pixels crossing the original image along at least one seam and having an energy level below a low energy threshold based upon the energy function. The image processor may also be further configured to generate the resized image based upon at least one resizing template. Additionally, the image processor may be further configured to generate the resized image based upon a structural similarity index metric.

In accordance with one embodiment, the image processor may further be configured to generate and transmit the resized image as a sequence of image frames defining a video image stream. By way of example, the operational parameter may comprise at least one of a channel Quality of Service (QoS) parameter and a remote terminal processing capacity parameter.

A related method aspect is for processing and transmitting images to a remote terminal over a communications channel. The method includes determining an operational parameter associated with at least one of the communications channel and the remote terminal using an image processor, and generating a resized image from an original image using the image processor based upon an energy function and the operational parameter. The method may further include transmitting the resized image from the video processor to the remote terminal over the communications channel.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Generally speaking, in a dynamic environment where video or still imagery is streamed in real or near real-time, channel/network conditions are constantly changing. Particularly dramatic changes occur in wireless networks, where channel quality is continuously subject to change. The present invention advantageously provides systems and methods for resizing images in real or near-real time, including still and motion (e.g., video) images.

Figure 1:
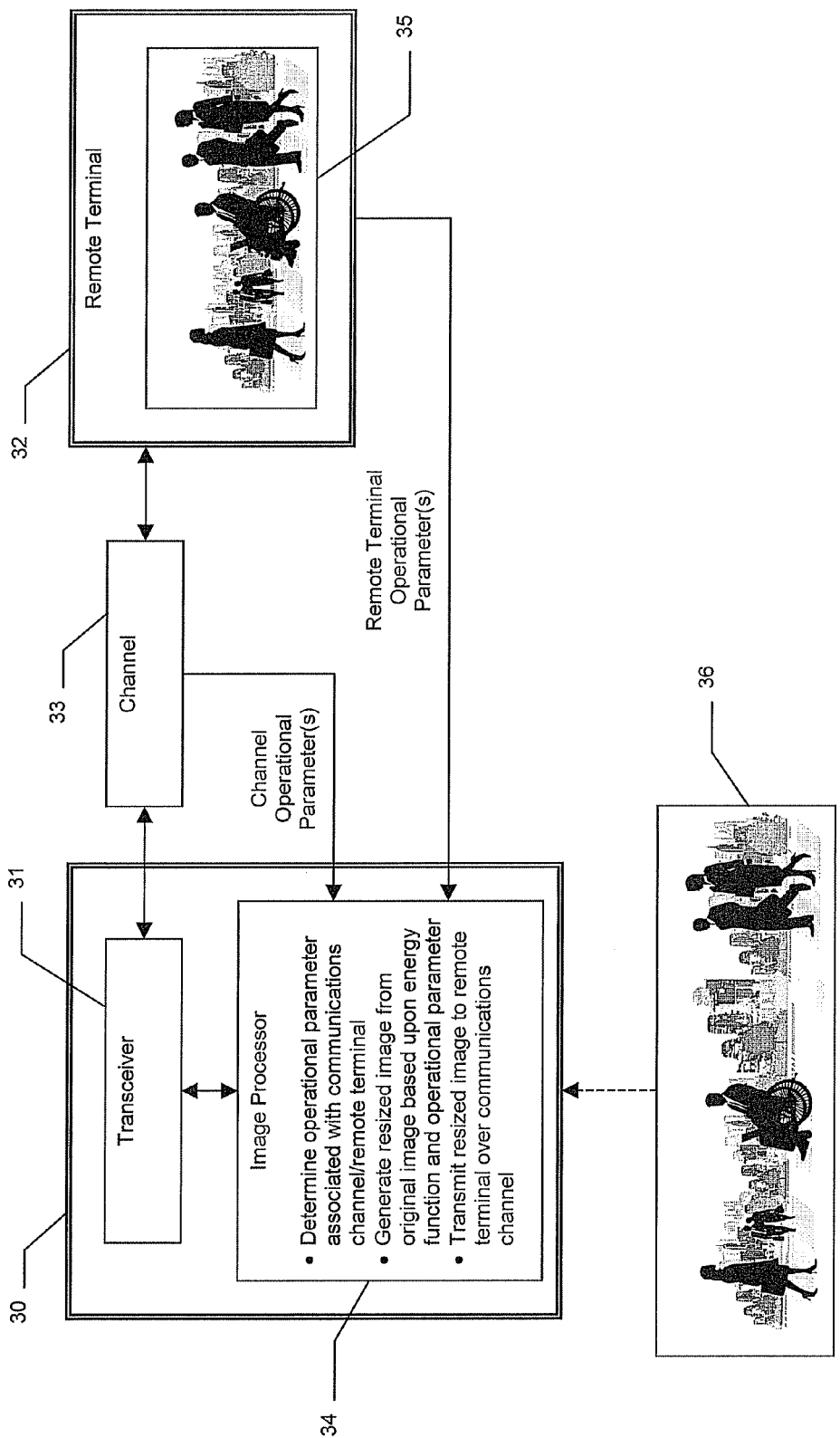
FIG. 1 is a schematic block diagram of an image processing system in accordance with the invention.
Figure 2:
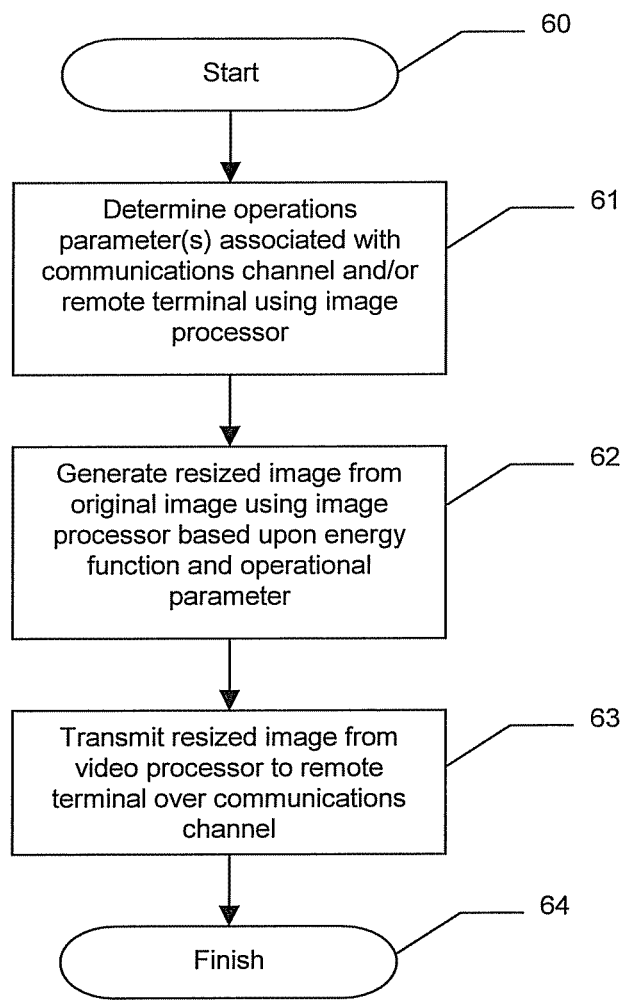
FIGS. 2 and 3 are flow diagrams illustrating image processing method aspects in accordance with the invention.

Referring initially to FIGS. 1 and 2, an image processing system 30 and associated method aspects are first described. The system 30 illustratively includes a transceiver 31 configured to communicate with a remote terminal 32 over a communications channel 33. By way of example, the communications channel may include a communications network and one or more wired or wireless links that connect the system 30 with the remote terminal 32, as will be discussed further below. The system 30 further illustratively includes an image processor 34 which cooperates with the transceiver 31 and is configured to determine an operational parameter associated with at least one of the communications channel 33 and the remote terminal 32, at Blocks 60-61. Moreover, the image processor 34 is also configured to generate a resized image 35 from an original image 36 based upon an energy function and the operational parameter, at Block 62, and transmit the resized image to the remote terminal 32 over the communications channel 33, at Block 63, thus concluding the method illustrated in FIG. 2 (Block 64)

Exemplary channel operational parameters may include a Quality of Service (QoS) parameter such as bit rate, latency, jitter, etc., associated with the network and/or the communications link(s) over which the image data is communicated to the remote terminal 32, as will be appreciated by those skilled in the art. Exemplary operational parameters associated with the remote terminal 32 may include a memory and/or processing capacity parameter, a power consumption parameter, a remote terminal display size parameter, a remote terminal processing latency parameter, etc. It should be noted that not all of these parameters need be used in all embodiments, and that both channel operational parameters and remote terminal operational parameters need not both be used in all embodiments. Of course, other suitable operational parameters beside those noted above may also be used, as will be appreciated by those skilled in the art. The operational parameter feedback advantageously allows the processor 34 to monitor QoS, etc., to determine how much resizing is appropriate at a given time or for a given image, as will be appreciated by those skilled in the art.

Figure 3:
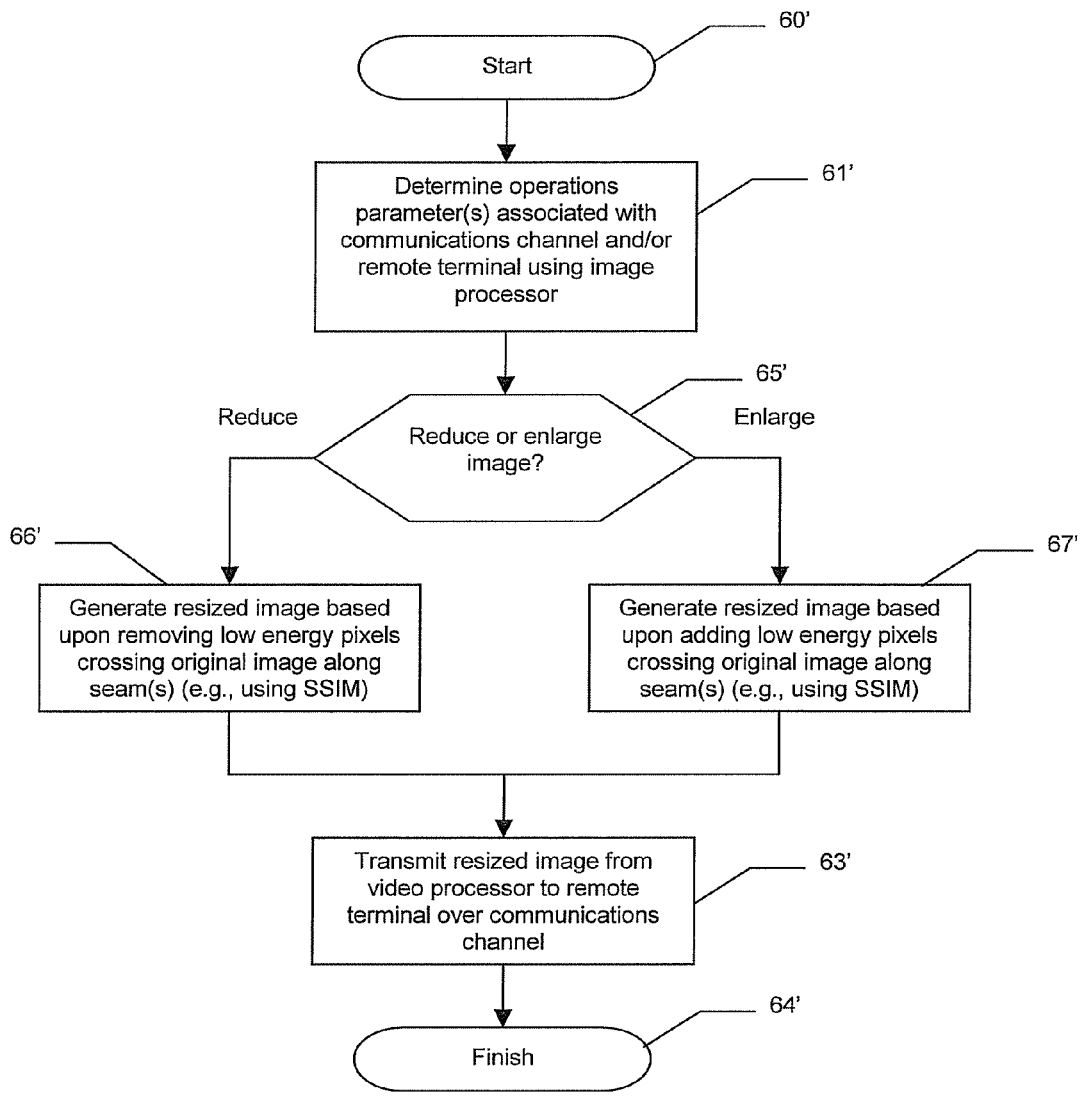

Referring additionally to FIG. 3, the image processor 34 may be configured to advantageously reduce or enlarge the original image 36, at Block 65. In some embodiments, the image processor 34 may reduce some portions of the image 36, and enlarge other portions. For example, an image may be enlarged in one direction (e.g., horizontal) and reduced in another direction (e.g., vertical) to provide a desired aspect ratio for the particular display of the remote terminal 35. Resizing in a vertical direction is possible as well. More particularly, the resized image may be generated based upon removing or adding, as appropriate, low energy pixels (i.e., pixels having an energy level below a low energy threshold as determined by the energy cost function) crossing the original image along one or more seams, at Blocks 66', 67', as will be discussed further below.

Various image sampling techniques are commonly used to resize images, but such techniques typically resize the images without taking the contents of the image into account (e.g., scale factor resizing). Seam carving, as described for example in the above-noted article by Avidan et al., is a relatively new image sizing technique that uses the concept of seams in an image to determine which pixels are appropriate to add or remove from an image. Seam carving locates seams in the image based on a criteria such as textures and adds or removes the "redundant" regions, depending on whether image enlargement or reduction is desired. In the example of FIG. 1, the original image 36 has been resized by removing vertical seams to collapse the image in the horizontal direction, bringing the people closer together while removing portions of the background city scenery.

The image processor 34 may be configured to generate the resized image using a seam carving technique based upon at least one resizing template. The system 30 thus not only advantageously allows for adaptive resizing that accounts for channel bandwidth, network conditions/quality of service (QoS), remote terminal parameters, etc., but which also provides for resizing and rendering of imagery (including video images) based on device settings and user requirements through the use of the templates. The system 30 advantageously uses statistical quality measures to correlate the quality of an original image (or sequence of images) with a resized one, and it also provides for user-defined definitions of what is important to retain in a given image or video. The resizing templates account for various image features such as textures, regions of movement and temporal activity, and various degradations, for example.

Figure 4:
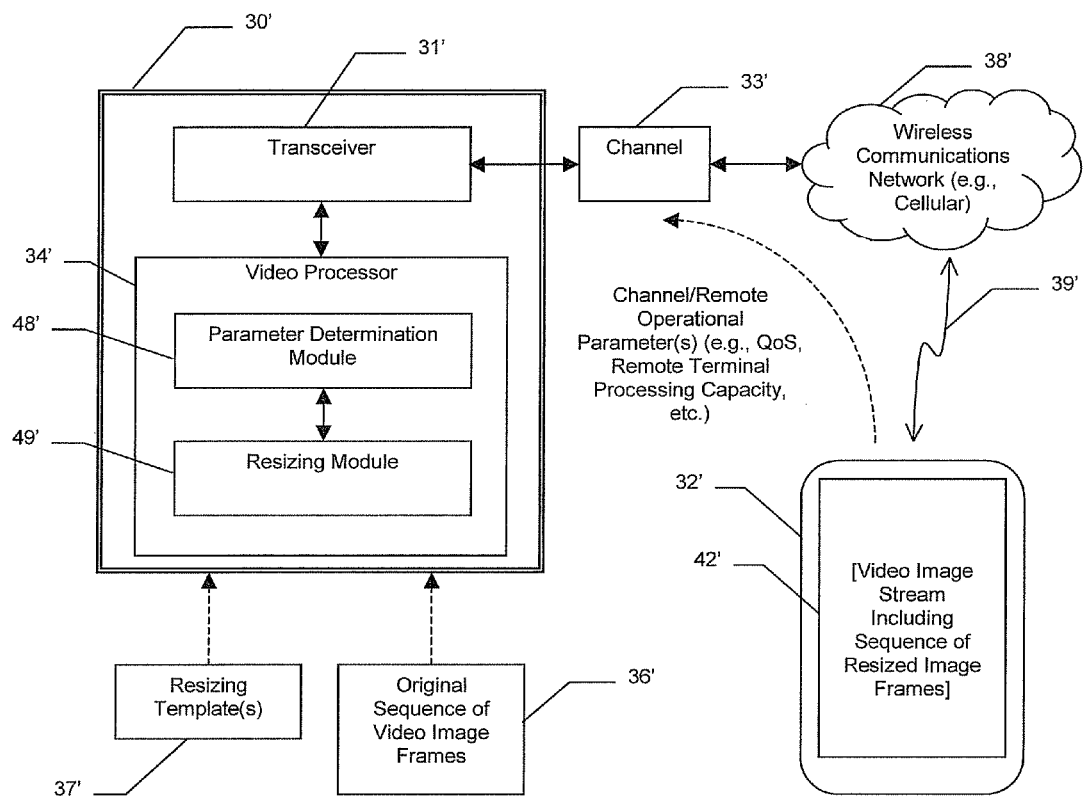
FIG. 4 is a schematic block diagram of an alternative embodiment of the image processing system of FIG. 1.

In the example illustrated in FIG. 4, one or more resizing templates 37' are provided to the processor 34', which in this embodiment is a video processor illustratively including a parameter determination module 48' and a resizing module 49' for performing the above-noted functions. Here, the video processor 34' is for processing an original sequence of video image frames 36'. Moreover, the remote terminal 32' in the present example is a mobile wireless communications device (e.g., a smart phone), which communicates with the video processor 34' via a wireless communications network 38' (e.g., a cellular network) over a wireless communications link 39', as will be appreciated by those skilled in the art. The remote terminal 32' illustratively includes a display 42' for displaying the video image stream transmitted from the video processor 34' including the sequence of resized video image frames. The processor 34' may embed the sequence of resized images into the original image transport stream, and/or other image steams, as will also be appreciated by those skilled in the art. For example, an HD video stream may be resized accordingly to a first template for an NTSC video feed, and according to a second template for a mobile device video feed. In some embodiments the different video streams may be published by separate RSS feeds, for example.

The resizing templates 37' allow for different features of importance to be retained in an image/video in different applications. For example, depending on the particular application, a user may be most concerned with one or more particular aspects, such as the foreground, regions of change, regions with many edges, regions with non-smooth texture, etc. Respective templates may be defined to focus on each of these aspects, and multiple templates may be combined to focus on a combination thereof.

By way of example, one particular template which may be implemented is a spatiotemporal template for removing regions where no activity or movement is occurring in a video feed, or where non-smooth textures exist. A general activity template would detect activity movement or textures below a smoothness threshold, as opposed to a specific type of activity or area of smoothness. Such templates may be used for keeping human faces/figures or objects of interest (e.g., cars) while removing others. Also, templates that retain specific activities of interest, such as, for example, a moving football player, automobile, etc. The systems 30 or 30' may advantageously be used for a variety of such scenarios by using different templates 37' defining different cost functions for the particular items or areas of interest in a given image or video feed.

An example of a general activity template is as follows. Given frames k and k+1, an optical flow between the two frames is calculated to find regions where "action" occurred. It should be noted that for computational efficiency, but at the cost of a reduced accuracy, the motion vectors in a compressed stream may be substituted for optical flow. The result is a vector field F. For frames k−1, k, k+1, the spatiotemporal texture is determined by calculating the standard deviation of an n*n*n voxel. The result is a cube of data S where each point indicates how much this location deviates from the background (an approximation of texture in image processing). A one-dimensional gradient along the x, y, t dimensions is calculated to yield the edges X, Y, T to aid in identifying regions where information of visual interest is present. Other similar templates or enhancements may be used to add more "calculated features" similar to those noted above, as will be appreciated by those skilled in the art. Moreover, it should also be noted that the seam carving approach may also be combined with other image resizing techniques (e.g., scaling, cropping, etc.) in some applications, if desired.

Figure 5:
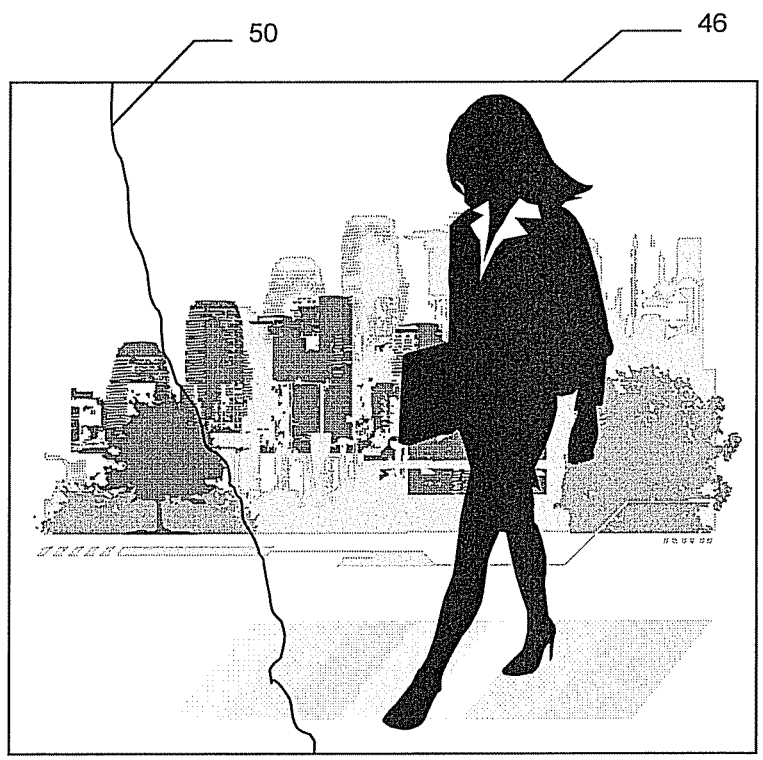
FIG. 5 is an image view illustrating a resizing operation performed by the system of FIG. 1 or 4.

Referring additionally to FIG. 5, the processor 34' advantageously removes or adds "seams" 50 in an original image 36' (e.g., a frame of a sequence of video images) using dynamic programming based upon the resizing template 37' until the desired resolution aspect ratio, etc., is achieved. Seams are defined by an energy function from the template(s) 37' described above. An energy cost function E=f(F, S, X, Y, T) is constructed based on the template definition and parameters defined above. One exemplary cost function is a weighted linear average of the various terms, although other energy cost functions may also be used. The operational parameters are used to help optimize the cost function based on the defined template 37'. For example, if the channel bandwidth gets reduced during peak times, the weighting factor on the texture map S may be increased to remove more "low texture" seams.

While it would be desirable to employ a subjective rating by a human user to determine how successful and realistic a resized image is, it is impractical to expect a person to be in the loop judging quality continuously, especially where video feeds with numerous images are concerned. Accordingly, other indicators or quality metrics of image resizing, such as peak signal-to-noise ratio (PSNR), may fail in evaluating the proposed intelligent resizing approach, as this is a pixel-based approach which may give errors that are too large.

One suitable approach is to use quality metrics, such as the Structural Similarity Index Metric (SSIM) that correlate to the human visual system and evaluate quality in terms of scene "structure." One such example is set forth in an article entitled, "Image quality assessment: From error visibility to structural similarity," IEEE Transactions on Image Processing, vol. 13, no. 4, pp. 600-612, April 2004, which is hereby incorporated herein in its entirety by reference. SSIM highly correlates with a Mean Opinion Score subjective quality metric used in the broadcast video industry, and is therefore well suited to the present application. SSIM in this context would work as follows. Given two images, SSIM is defined as:

$$SSIM(x, y) = \frac{(2\mu_x\mu_y + C_1)(2\sigma_x\sigma_y + C_2)}{(\mu_x^2 + \mu_y^2 + C_1)(\sigma_x^2 + \sigma_y^2 + C_2)},$$

where $\mu_x$ is the average of x; $\mu_y$ is the average of y; $\sigma_x^2$ is the variance of x; and $\sigma_y^2$ is the variance of y. If the SSIM value is too low, this may provide a feedback flag to the algorithm to readjust the weighting factors to improve quality, as will be appreciated by those skilled in the art.

The system 30, 30' advantageously provides for intelligent resizing of video, motion imagery, and still imagery based on user-defined criteria. It therefore provides an approach to select a desired resizing algorithm based on a feedback mechanism from both QoS or other operational parameters and visual quality metrics. Image processing may be performed in batch or real/near-real time mode. The system 30, 30' also advantageously allows for intelligent reformatting of media based on content and enhanced delivery to various devices for their respective settings (e.g. screen size, CPU power, etc.). The ability to intelligently resize content is particularly important with the large variety of display sizes ranging from large LCD screens to handheld devices, in addition to advancements in wireless technology that allow ever-larger content to be downloaded or streamed to mobile devices.

The system 30, 30' may advantageously be used for various applications, such as broadcast, medical, and surveillance, for example. In the case of medical imagery, for example, the system 30, 30' could be used to remove normal cells from an image to reveal abnormal (e.g., malignant) cells from an image to reveal abnormal (e.g., malignant) cells since malignant cells exhibit a rougher surface and texture. Of course, the systems and methods described herein may be used with other applications where resizing of imagery may be desirable, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An image processing system comprising:
   a transceiver configured to communicate with a remote terminal over a communications channel; and
   an image processor cooperating with said transceiver and configured to
      determine an operational parameter associated with at least one of the communications channel and the remote terminal,
      generate a resized image from an original image based upon an energy function and the operational parameter and at least one spatiotemporal template configured to detect and remove activity movement and textures below a smoothness threshold, the at least one spatiotemporal template for determining regions of movement in the image over a plurality of image frames based upon a motion vector field and a spatiotemporal texture determined by calculating standard deviations of voxels to determine deviation from a background of the image, and
      transmit the resized image to the remote terminal over the communications channel.

2. The image processing system of claim 1 wherein said image processor is further configured to generate the resized image based upon removing pixels crossing the original image along at least one seam and having an energy level below the smoothness threshold based upon the energy function.

3. The image processing system of claim 1 wherein said image processor is further configured to generate the resized image based upon adding low energy pixels crossing the original image along at least one seam.

4. The image processing system of claim 1 wherein said image processor is further configured to generate the resized image based upon a structural similarity index metric.

5. The image processing system of claim 1 wherein said image processor is further configured to generate and transmit the resized image as a sequence of the image frames defining a video image stream.

6. The image processing system of claim 1 wherein the operational parameter comprises a channel Quality of Service (QoS) parameter.

7. The image processing system of claim 1 wherein the operational parameter comprises a remote terminal processing capacity parameter.

8. A video processing system comprising:
a transceiver configured to communicate with a remote terminal over a wireless communications link; and
an video processor cooperating with said transceiver and configured to
determine an operational parameter associated with at least one of the wireless communications link and the remote terminal,
generate resized image frames from a sequence of original image frames defining a video image stream based upon an energy function and the operational parameter and at least one spatiotemporal template configured to detect and remove activity movement and textures below a smoothness threshold, the at least one spatiotemporal template for determining regions of movement in the image over a plurality of image frames based upon a motion vector field and a spatiotemporal texture determined by calculating standard deviations of voxels to determine deviation from a background of the image, and
transmit the resized image frames to the remote terminal over the wireless communications link.

9. The video processing system of claim 8 wherein said video processor is further configured to generate the resized image frames based upon removing pixels crossing the original image frames along at least one seam and having an energy level below the smoothness threshold based upon the energy function.

10. The video processing system of claim 8 wherein said video processor is further configured to generate the resized image frames based upon adding low energy pixels crossing the original image frames along at least one seam.

11. The video processing system of claim 8 wherein the operational parameter comprises at least one of a wireless communications link Quality of Service (QoS) parameter and a remote terminal processing capacity parameter.

12. An image processor comprising:
a parameter determination module configured to determine an operational parameter associated with at least one of a communications channel and a remote terminal coupled to the communications channel; and
a resizing module configured to generate a resized image from an original image for transmission to the remote terminal over the channel based upon an energy function and the operational parameter and at least one spatiotemporal template configured to detect and remove activity movement and textures below a smoothness threshold, the at least one spatiotemporal template for determining regions of movement in the image over a plurality of image frames based upon a motion vector field and a spatiotemporal texture determined by calculating standard deviations of voxels to determine deviation from a background of the image.

13. The image processor of claim 12 wherein said resizing module is configured to generate the resized image based upon removing low energy pixels crossing the original image along at least one seam.

14. The image processor of claim 12 wherein said resizing module is further configured to generate the resized image based upon adding low energy pixels crossing the original image along at least one seam.

15. A method for processing and transmitting images to a remote terminal over a communications channel comprising:
determining an operational parameter associated with at least one of the communications channel and the remote terminal using an image processor;
generating a resized image from an original image using the image processor based upon an energy function and the operational parameter and at least one spatiotemporal template configured to detect and remove activity movement and textures below a smoothness threshold, the at least one spatiotemporal template for determining regions of movement in the image over a plurality of image frames based upon a motion vector field and a spatiotemporal texture determined by calculating standard deviations of voxels to determine deviation from a background of the image; and
transmitting the resized image from the video processor.

16. The method of claim 15 wherein generating the resized image comprises generating the resized image based upon removing pixels crossing the original image along at least one seam and having an energy level below the smoothness threshold based upon the energy function.

17. The method of claim 15 wherein generating the resized image comprises generating the resized image based upon adding low energy pixels crossing the original image along at least one seam.

18. The method of claim 15 wherein generating the resized image comprises generating the resized image as a sequence of image frames defining a video image stream.

19. The method of claim 15 wherein the operational parameter comprises at least one of a channel Quality of Service (QoS) parameter and a remote terminal processing capacity parameter.

* * * * *